(12) United States Patent
Inoue et al.

(10) Patent No.: US 9,394,446 B2
(45) Date of Patent: Jul. 19, 2016

(54) METHOD FOR RECOVERING RU COMPLEX DYE FROM USED DYE SOLUTION

(71) Applicant: Tanaka Kikinzoku Kogyo K.K., Toyko (JP)

(72) Inventors: Kenichi Inoue, Tsukuba (JP); Hiroki Sato, Tsukuba (JP); Masayuki Saito, Tsukuba (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 0 days.

(21) Appl. No.: 14/440,733

(22) PCT Filed: Nov. 12, 2013

(86) PCT No.: PCT/JP2013/080497
§ 371 (c)(1),
(2) Date: May 5, 2015

(87) PCT Pub. No.: WO2014/077230
PCT Pub. Date: May 22, 2014

(65) Prior Publication Data
US 2015/0299467 A1    Oct. 22, 2015

(30) Foreign Application Priority Data
Nov. 16, 2012  (JP) .................. 2012-252493

(51) Int. Cl.
*C07F 15/00* (2006.01)
*C09B 57/10* (2006.01)
*H01M 14/00* (2006.01)

(52) U.S. Cl.
CPC .............. *C09B 57/10* (2013.01); *H01M 14/00* (2013.01); *Y02E 10/542* (2013.01); *Y02P 70/521* (2015.11)

(58) Field of Classification Search
CPC .................. C09B 57/10; B01D 11/02
USPC .......................................... 556/136
See application file for complete search history.

(56) References Cited

U.S. PATENT DOCUMENTS 8,247,689 B2 *  8/2012  Chen ............... C07D 213/20
                                              136/256
2013/0323934 A1 * 12/2013  Wada ............... H01G 9/2068
                                              438/758

FOREIGN PATENT DOCUMENTS

| AU | 2009200356 A1 * | 9/2009 | ............. C09B 57/10 |
|---|---|---|---|
| JP | 2009215539 A | 9/2009 | |
| JP | 2010159340 A | 7/2010 | |
| JP | 2011048938 A | 3/2011 | |
| JP | 2011513530 A | 4/2011 | |
| WO | WO 2012070181 A1 | 5/2012 | |

OTHER PUBLICATIONS

Written Opinio of the ISA (Translation); PCT/JP2013/080497, Mailed Feb. 18, 2014.*
PCT, International Search Report PCT/JP2013/080497, Feb. 18, 2014.

* cited by examiner

*Primary Examiner* — Porfirio Nazario Gonzalez
*Assistant Examiner* — Kofi Adzamli
(74) *Attorney, Agent, or Firm* — Orrick, Herrington & Sutcliffe LLP

(57) ABSTRACT

The present invention relates to a method for recovering Ru complex dye from a used dye solution containing a polypyridine Ru complex as a Ru complex, the used dye solution having been discharged from a step of manufacturing a dye-sensitized solar cell, the method including the steps of:
 (a): filtering the used dye solution to separate and remove solid content.
 (b): bringing a separating solvent including an ether-based solvent indicated by a chemical formula $C_xH_{(2x+1)}$—O—$C_yH_{(2y+1)}$ (x=1 to 4 and y=1 to 4, with the proviso that x+y≥4) or an alkane-based solvent indicated by a chemical formula $C_xH_{(2x+2)}$ (x=5 to 7) into contact with the used dye solution to separate the Ru complex dye.

7 Claims, 3 Drawing Sheets

US 9,394,446 B2

METHOD FOR RECOVERING RU COMPLEX DYE FROM USED DYE SOLUTION

TECHNICAL FIELD

The present invention relates to a method for recovering Ru complex dye in a re-usable state from a used dye solution containing Ru complex dye which is discharged from a step of manufacturing a dye-sensitized solar cell.

BACKGROUND ART

Compared to a silicone solar cell which has been already put into practical use (monocrystalline silicone solar cell, polycrystalline silicone solar cell, or the like), a dye-sensitized solar cell (hereinbelow, referred to as DSC) has both high efficiency and low production cost, and thus it is highly recognized as a solar cell of third generation. Regarding the DSC, one of the important factors for improving power conversion efficiency is development and selection of a dye material. As a dye material which recently receives attention, a polypyridine Ru complex, which is a Ru (ruthenium)-based complex, is known (for example, the polypyridine Ru complex dye of Patent Document 1 or the like is known).

The step of manufacturing DSC includes coating paste containing $TiO_2$ particles with nano size on a transparent conductive substrate followed by calcination to form a $TiO_2$ layer, impregnating the substrate in a dye solution to adsorb dye on pores of the $TiO_2$ layer, and forming a counter electrode and an electrolyte layer.

However, cost relating to dye, which is the main constitution of DSC, accounts for large portion of the cost for manufacturing DSC. In this regard, a Ru complex capable of exhibiting desirable performances as dye of DSC is often expensive. Since many of the Ru complex dye have a complex structure, it requires many steps from synthesis of a ligand to synthesis of complex dye. As such, when a final purification step is also included, the production cost naturally increases.

From the viewpoint of reducing the cost for manufacturing DSC, the present inventors tried recovering complex dye from a used dye solution which is discharged from a step of manufacturing DSC. Conventionally, a used dye solution discharged from a step of manufacturing DSC is generally discarded as a waste, and reuse has never been tried. Meanwhile, according to the study by the present inventors, it was confirmed that the use ratio of a dye solution (use amount of complex dye) is low for a step of manufacturing DSC and only several % of the complex dye in a solution is adsorbed onto a substrate per impregnation. Namely, according to a conventional step of manufacturing DSC, the used solution containing most of the complex dye is simply discarded as a waste liquid. In addition, if the complex dye can be recovered from a used solution, it can be said that the cost for providing the complex dye is reduced.

RELATED ART DOCUMENT

Patent Document

Patent Document 1: JP 2011-513530 A

SUMMARY OF THE INVENTION

Problems to be Solved by the Invention

However, even when the complex dye can be recovered from a used dye solution, it is not always easy. To reduce the cost for providing the complex dye, it is required that the recovered complex dye can be used in unchanged form as a raw material for DSC, that is, it is highly pure complex dye having no deterioration.

From this point of view, as a constitution of a dye solution for manufacturing DSC, a constitution in which only the complex dye is dissolved in a solvent is applied as the simplest form. However, to improve performances of DSC, in many cases a plurality of additives are added. Furthermore, when a Ru complex is recovered in a re-usable state from a used dye solution, it is necessary to consider the absence or presence of deterioration of the Ru complex dye which is caused by use environment or influences of additives.

Furthermore, at the time of treating a used dye solution, it is necessary to study the recovery process while considering the aforementioned constitution. In this regard, the constitution of the dye solution may include various additives other than the complex dye and solvent; therefore it is variable. As such, in order to recover Ru complex dye from a used dye solution, it is expected that suitable combination of a separation means is necessary while considering physical properties of a solvent or each additive. However, when a different separation means is combined for each subject, the step of recovering Ru complex dye becomes complicated, leading to an increase in recovery cost.

The present invention is devised in view of the aforementioned circumstances, and provided is a method for recovering Ru complex dye in a re-usable state from a used dye solution, which is discharged as a waste liquid during manufacture of DSC in which Ru complex dye is used. In particular, provided is a method with a simplified recovery step while constitution of a dye solution is taken into consideration.

Means for Solving the Problems

In order to solve the problems described above, the present inventors intensively studied on a Ru complex dye solution used for manufacturing DSC, in terms of constitution and the absence or presence of a change in the constitution before and after use. As described herein, the simplest constitution of a dye solution indicates the complex dye dissolved in a solvent. The solvent indicates alcohols (ethanol, butanol, or the like), which are admixed with an organic solvent such as acetonitrile, if necessary.

Furthermore, there are many cases in which various additives are added to a dye solution as described above. Examples of an additive which is frequently used include a co-adsorbent. Since the co-adsorbent adsorbs onto a $TiO_2$ layer together with complex dye to suppress association of dye molecules, its necessity is determined based on the type of Ru complex dye which is added for use. Examples of the co-adsorbent which can be used include organic substances such as CDCA (chenodeoxychloic acid), GBA (γ-guanidinobutyric acid), and DPA (decylphosphonic acid) in addition to DINHOP (bis-(3,3-dimethyl-butyl)-phosphinic acid). Furthermore, as an additional additive, a dye (cocktail dye) different from the Ru complex dye may be added. The cocktail dye is added when there is a need to broaden a responding wavelength region of DSC. As for the cocktail dye, an organic substance such as D35 dye, D131 dye, D149 dye, and D205 dye is used. Since these additives are dissolved in a solvent together with a complex dye, the dye solution is a monophase solution.

Here, taking the possibility of component deterioration of a dye solution having the aforementioned constitution before use into consideration, the step of adsorbing a dye solution onto a substrate during a step of manufacturing DSC is normally performed under the control of temperature or humidity. Thus, it is expected that the deterioration of Ru complex dye in a dye solution is not likely to happen according to thermal decomposition, hydrolysis, or the like. It is also believed that, although the complex dye or the like is consumed in a used dye solution, there is no great change in its composition. Those have been confirmed by an actual analytical test by the present inventors.

However, there is a change occurring in a dye solution which is used for a step of manufacturing DSC. The change indicates incorporation of solid content from an impregnated substrate. The solid content indicates fine powder of glass or ITO constituting the substrate (conductive transparent substrate) or fine powder of $TiO_2$ which is released from a $TiO_2$ layer on the substrate.

It was confirmed from the above that, to recover Ru complex dye from a used dye solution, it is necessary to remove a solvent and various additives having the same composition as that before use and also to remove a solid content. Regarding those treatments, filtration as a common means for solid-liquid separation can be used for removing the solid content.

Meanwhile, with regard to separation and removal of a solvent and various additives that are dissolved in the solvent, the solvent can be separated by distillation as it has different physical properties from the Ru complex dye. However, many of the additives like co-adsorbent and cocktail dye have physical properties that are close to those of a complex dye, and thus it is difficult to separate and remove them by distillation. As such, when distillation is a main procedure, it is necessary to combine it with a separation means required for the additives, and thus the number of steps is increased.

Accordingly, the present inventors studied a separation method by which a solvent and additives can be simultaneously removed. The idea as a basis of this study is that the additives in a dye solution are present in a dissolved state in a solvent. Namely, when a solvent which has high affinity (dissolving property) for the solvent and various additives but low affinity for Ru complex dye is used, the Ru complex dye not dissolved in the solvent can be separated. The present inventors intensively studied on this separating solvent, and as a result, found that an ether-based solvent or an alkane-based solvent satisfies the requirement, and accomplished the present invention accordingly.

Specifically, the present invention relates to a method for recovering Ru complex dye from a used dye solution containing a polypyridine Ru complex as a Ru complex, the used dye solution having been discharged from a step of manufacturing a dye-sensitized solar cell, the method including the following steps.

Step (a): a step of filtering the used dye solution to separate and remove solid content.

Step (b): a step of bringing a separating solvent including an ether-based solvent indicated by the chemical formula $C_xH_{(2x+1)}$—O—$C_yH_{(2y+1)}$ (x=1 to 4 and y=1 to 4, with the proviso that x+y≥4) or an alkane-based solvent indicated by the chemical formula $C_xH_{(2x+2)}$ (x=5 to 7) into contact with the used dye solution to separate the Ru complex dye.

As described above, the present invention relates to recovery of Ru complex dye in non-used state by performing separation of Ru complex dye from a used dye solution resulting from a step of manufacturing DSC, based on separation of solid content by filtration and a predetermined separating solvent.

The filtering step of this recycling process is to remove of solid content in a used dye solution. The solid content indicates glass, ITO, or $TiO_2$ which is a substrate-constituting material and is released in a small amount from a substrate during a step of impregnating a substrate formed with a $TiO_2$ layer in a dye solution. Since the solid content is often in fine powder state, it is preferable that the conditions for filtering step include a filtering under reduced pressure in which a membrane filter (pore size of 0.45 μm or less) is used. The filtering under reduced pressure is preferably performed at 0.04 MPa or less. The filtering step is preferably performed before the separating step using a separating solvent.

Furthermore, Ru complex is separated by bringing a separating solvent into contact with a used dye solution. This is because the ether-based solvent or alkane-based solvent which is applied as a separating solvent can dissolve an organic substance which is used as a solvent and an additive (co-adsorbent, cocktail dye) of a dye solution while it cannot dissolve Ru complex dye. For such reasons, Ru complex dye separated from the solvent or the like can be precipitated by this treatment.

Now, explanations are given for a separating solvent. First of all, the ether-based solvent is including ether which has the chemical formula of $C_xH_{(2x+1)}$—O—$C_yH_{(2y+1)}$ (x=1 to 4 and y=1 to 4, with the proviso that x+y≥4). Here, limiting the carbon numbers of alkyl groups (x, y) which bind to the oxygen atom to 1 to 4 is to ensure the dissolving property of an organic substance in a dye solution. According to the study by the present inventors, the dissolving property of an organic substance in a dye solution decreases in accordance with an increase in the carbon number of the ether-based solvent. With a separating solvent in which an organic substance is unlikely to get dissolved, separation between Ru complex dye and an organic substance is difficult so that the range of x and y is limited. Furthermore, having the carbon number of 4 or more for the sum of x and y is due to the reason that ether with the carbon number of 3 or less is gas at room temperature and atmospheric pressure so that it is extremely difficult to use it as a solvent.

Furthermore, with regard to the ether-based solvent as a separating solvent, the alkyl groups which bind to the oxygen may be the same or different from each other (that is, x and y are the same or different from each other). When x and y are different from each other, the skeleton has non-symmetry and the dissolving property for an organic substance may be improved more. Furthermore, the alkyl group may be linear or branched. Based on the above, examples of the ether-based solvent which is applied in the present invention include diethyl ether, diisopropyl ether, methyl propyl ether, ethyl propyl ether, dibutyl ether, and t-butyl methyl ether. Particularly preferred ether-based solvent is diisopropyl ether and t-butyl methyl ether, because they can dissolve a broad range of organic substances and also can ensure safety during large-scale use compared to ether with a low carbon number which has a low flash point.

Meanwhile, as for the alkane-based solvent, alkane having the chemical formula of $C_xH_{(2x+2)}$ (x=5 to 7) can be applied. The carbon number is limited in consideration of having liquid at room temperature and atmospheric pressure and a dissolving property of an organic substance present in a dye solution. Examples of the solvent which is applied as an alkane-based solvent include pentane, hexane, and heptane.

The separating solvent consisting of an ether-based solvent or an alkane-based solvent is a poor solvent for the polypyridine Ru complex dye. Furthermore, by bringing an excessively large amount of it into contact with a dye solution, the complex dye dissolved in a dye solution can be precipitated. The use amount of the separating solvent is preferably three times or more compared to the dye solution. The upper limit of the use amount of the solvent is not particularly limited.

However, considering cost relating to a solvent or the like, it is preferably 100 times or less compared to the dye solution.

The treatment temperature for the aforementioned filtering step and the separating step is preferably 40° C. or lower. Since the Ru complex for DSC is easily deteriorated (decomposed) at high temperature, when the treatment temperature is 40° C. or higher, there is a possibility that the Ru complex is deteriorated and cannot be used again. For such reasons, it is preferable to manage temperature of both such that the liquid temperature at the time of contacting the used dye solution with a separating solvent is not higher than 40° C. Furthermore, those treatments are preferably performed under a light-shielding environment, because the Ru complex also has higher sensitivity for light. Examples of the specific means include performing the treatment itself in a dark space or using a treatment device of which inside is prepared as a dark space. It is also preferable that the treatment device be fully dried and substituted with inert gas to prevent deterioration of Ru complex caused by water or oxygen.

As described above, in the present invention, the solvent and additives of a used dye solution are simultaneously separated and removed only by a contact treatment which uses a separating solvent. However, a supplementary step may be added to this step.

As a supplementary step of the present invention, a distillation step can be mentioned first. Although removal of additives such as a co-adsorbent is difficult, distillation is effective for removal of a solvent. Thus, by performing distillation before a separating step using a separating solvent, the solvent amount is reduced so that the use amount of a separating solvent for the separating step can be reduced.

However, with regard to conditions for distillation step as a thermal separating means, it is necessary to set strict conditions. This is because the Ru complex dye can be easily deteriorated by heat, oxygen, or light as described above. For the distillation step, distillation under reduced pressure is applied, because, by having reduced pressure conditions, the distillation temperature is lowered as much as possible and deterioration of the Ru complex dye caused by heat can be suppressed. Specifically, the pressure is set at 150 to 1000 Pa and the temperature is set at 40° C. or lower.

Furthermore, it is necessary to perform the distillation treatment under inert gas atmosphere and also under light-shielded state. The reason is to prevent deterioration of the Ru complex dye by oxygen and light. As such, it is necessary that the inside of a distillation device is prepared as a dark space and the inside of the device is substituted with inert gas. Meanwhile, examples of the inert gas include argon and nitrogen.

As for the distillation treatment, a treatment under changed conditions can be performed several times. Such multi-stage distillation treatment is useful for removing a solvent when an additive with a high boiling point is included in a dye solution. For example, as a solvent of a dye solution, t-butanol or a mixture solvent of t-butanol and acetonitrile is used in many cases. However, there may be a case in which a dissolution aid for complex dye such as dimethyl sulfoxide (DMSO) is added as an additive. The dissolution aids often have a higher boiling point than that of the solvent, and when distillation is performed for a dye solution containing them, the solvent is evaporated at an early stage, but as the concentration of the dissolution aids increases according to a decrease of the liquid amount, evaporation of the solvent becomes difficult. Accordingly, by changing the distillation conditions with lowering the pressure, it becomes possible to remove the solvent. Thus, when the constitution of the dye solution as a treatment subject is complex, a multi-stage treatment under varying distillation conditions is effective.

Meanwhile, although the distillation step is effective for removing a solvent, it is not necessary to remove the entire amount of the solvent when the distillation step is performed. That is because, depending on the type of a solvent, there can be a solvent which can control the behaviors of additives in a dye solution, and for such reasons, keeping part of the solvent as residuals is also effective (for the details, see Example 7 described below). Furthermore, that is also because the removal of a solvent during a separating step by using a separating solvent, which is an essential step of the present invention, is still possible even when the solvent is kept as residuals.

As a supplementary step of the present invention, a recrystallization step can be also applied. The recrystallization step is useful for removing an organic substance contained in conjunction with Ru complex dye, which is recovered by the separating step. Application of the recrystallization step is preferable when a dissolution aid is used for the solvent of a dye solution. Examples of the organic substance as a dissolution aid include, in addition to the aforementioned DMSO, N,N-dimethyl formamide (DMF), methoxyethanol, and γ-butyrolactone. The dissolution aid is an additive for ensuring the dissolving property of Ru complex dye in t-butanol or the like. The dissolution aid also remains as residuals in a used dye solution. Furthermore, in terms of supplementing the dissolving property of the Ru complex dye, the dissolution aid is easily adsorbed onto a complex dye, and thus it may remain as residuals in the Ru complex dye after the separating step. Furthermore, separation and removal by distillation are also difficult.

The recrystallization step is a step of precipitating and purifying the Ru complex dye according to temperature modification or pH modification, which utilizes a difference in solubility between Ru complex dye and a dissolution aid for a predetermined solvent. According to a preferred recrystallization step of the present invention, the Ru complex dye recovered by the separating step is dissolved in an alkali solution having pH of 10 or higher, and by lowering pH to a neutral to weakly acid region according to addition of an acid, the Ru complex dye is precipitated. The alkali solution preferred for this method is any alkali solution including tetrabutyl ammonium hydroxide, sodium hydroxide, or potassium hydroxide. The alkali solution is preferably a mixture solvent having methanol suitably added to an aqueous solution of the aforementioned alkali salt. Furthermore, the acid added for pH modification is preferably nitric acid.

As described above, by combining suitably a washing step and a recrystallization step according to the constitution of a used dye solution while having the filtering and distillation steps as a main step, the Ru complex dye can be recovered in a re-usable state.

With regard to a method of recovering the Ru complex dye from a used dye solution according to the present invention, the Ru complex dye as a subject is polypyridine Ru complex. In the polypyridine Ru complex, a plurality of pyridine derivatives is coordinated to Ru as a center metal. For example, it is useful for a dye consisting of the following polypyridine Ru complex.

TABLE 1
| No. | Structural formula |
| --- | --- |
| N749 | 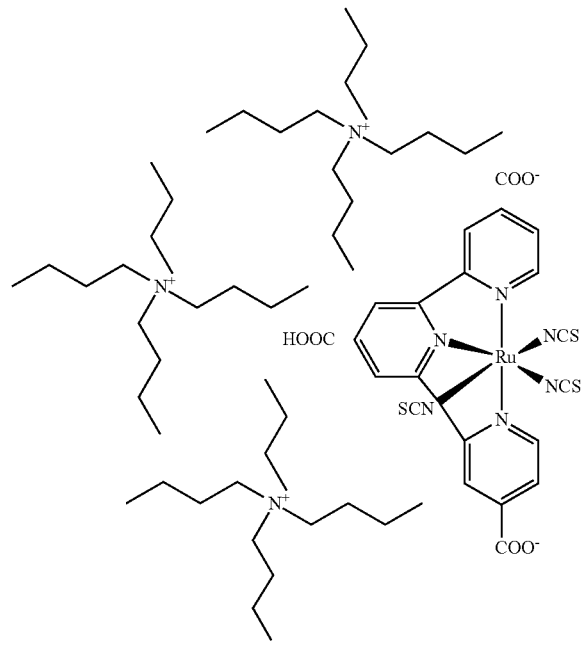 |
| N719 | 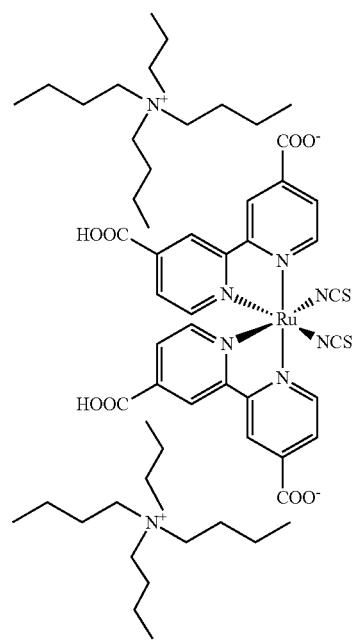 |

TABLE 1-continued
| No. | Structural formula |
|---|---|
| Z907 | 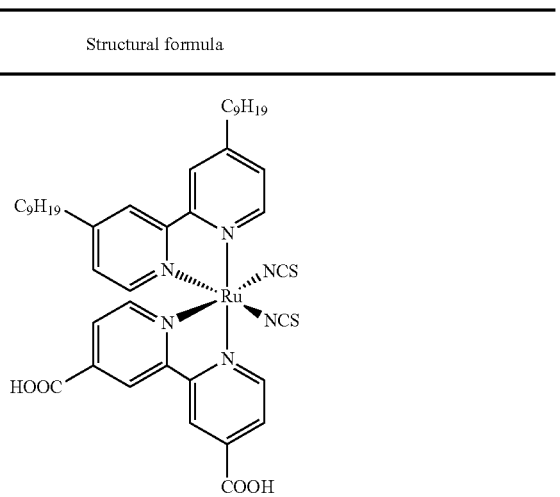 |
| CYC-B1 | 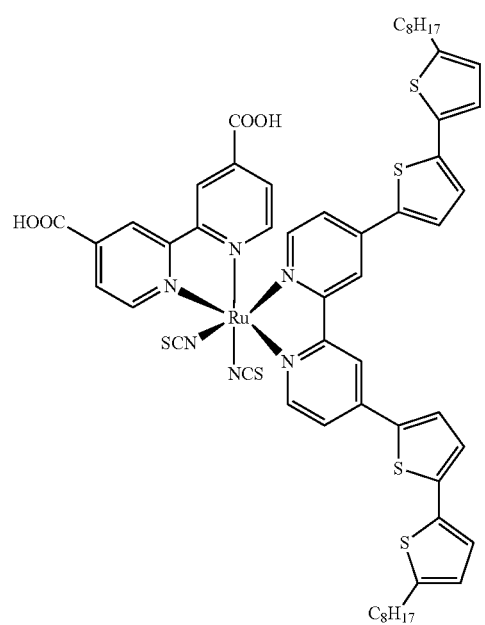 |

TABLE 1-continued
| No. | Structural formula |
|---|---|
| CYC-B11 | 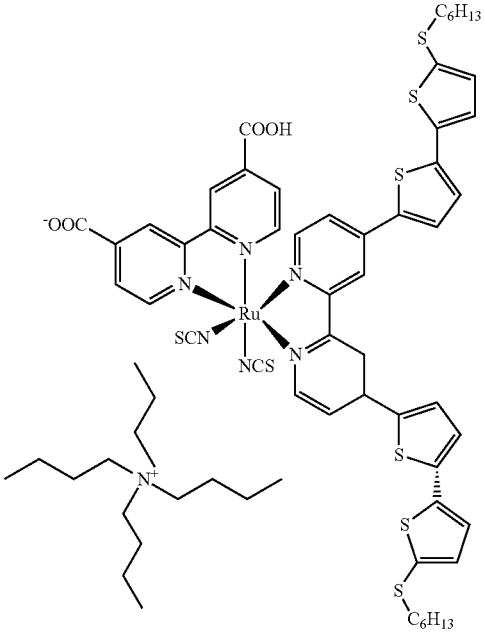 |
| K19 | 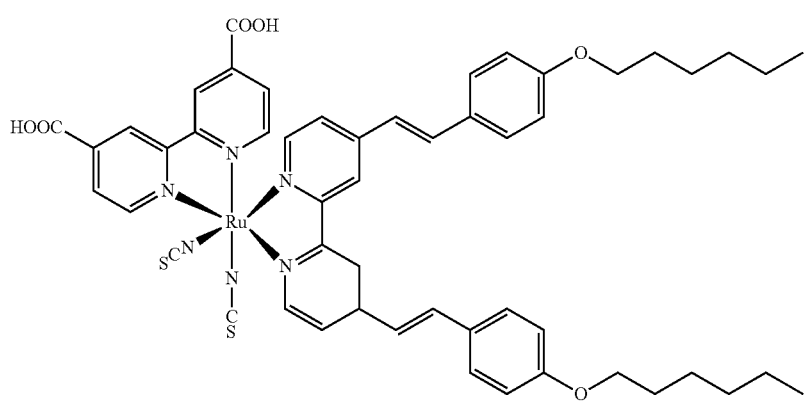 |
| N-3 | 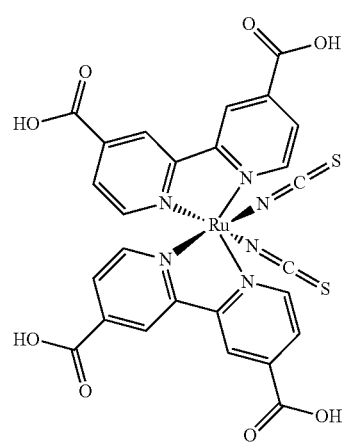 |

TABLE 1-continued

| No. | Structural formula |
|---|---|
| HRS-1 | Ru complex with bipyridine ligands bearing COOH groups, two NCS ligands, and bipyridine bearing vinyl-thiophene-$C_6H_{13}$ substituents |

Advantageous Effects of the Invention

As described above, the present invention relates to a method for recovering Ru complex dye from a used dye solution which is discharged during a process for manufacturing a dye-sensitized solar cell. According to the present invention, as a distillation step and a recrystallization step are suitably combined while having the filtering step and the optimized separating step as a base, a used dye solution having a broad range of constitution can be dealt with so that the Ru complex dye is efficiently recovered.

The Ru complex dye recovered by the present invention has very high quality with no impurities so that it can be directly applied for manufacture of a dye-sensitized solar cell. According to the present invention, a used dye solution conventionally treated as waste liquid can be efficiently utilized, and not only the cost down of Ru complex dye, which is naturally expensive, can be achieved but also an environmental load involved with novel synthesis of a complex can be reduced, and thus it is an invention which is suitable for a solar cell as an original object.

DESCRIPTION OF EMBODIMENTS

Figure 1:
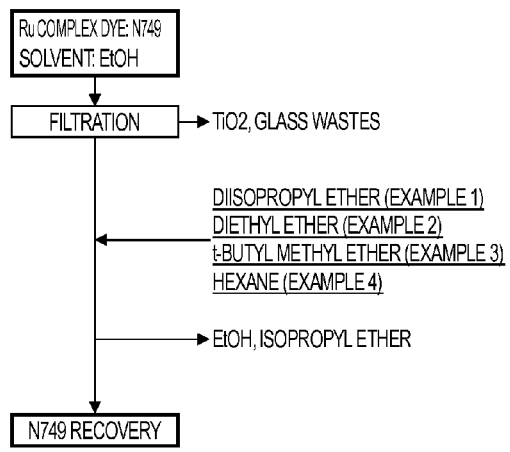
FIG. 1 illustrates a summary of the step of recovering Ru complex dye in Example 1 to Example 7.
Figure 1:
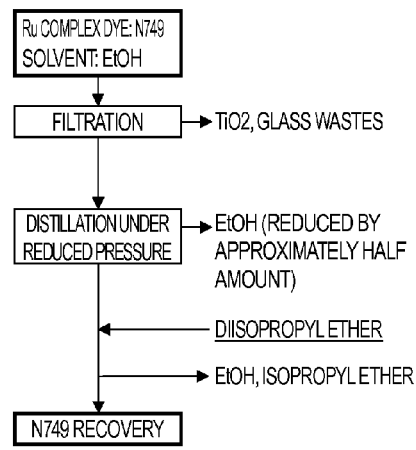
Figure 1:
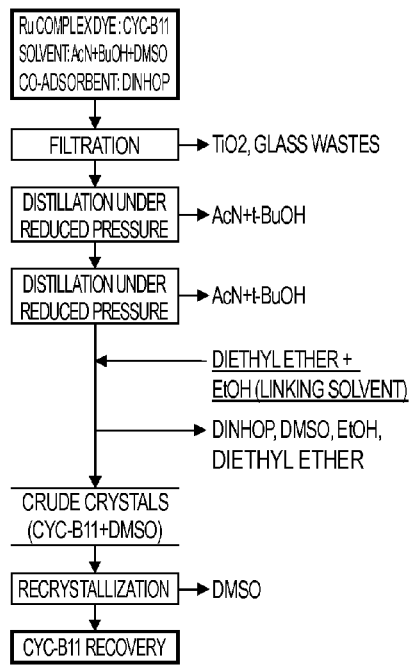
Figure 1:
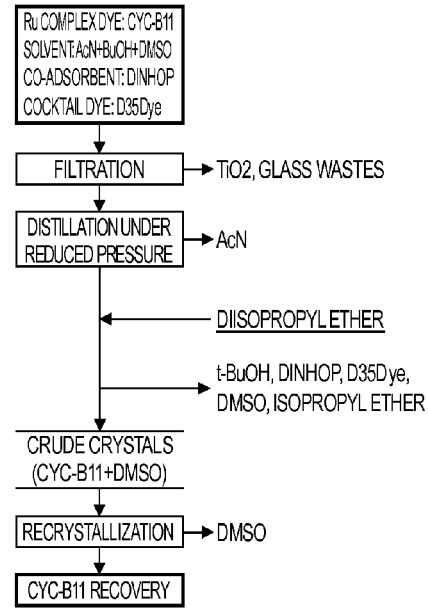

Hereinbelow, preferred embodiments of the present invention are described. In the present embodiment, first, as a preliminary test, separating performances of various ether-based solvents and alkane-based solvent for Ru complex dye and an organic substance in a dye solution were evaluated. After that, by using a used dye solution containing various Ru complex dyes as a subject for treatment, recovery of the Ru complex dye was performed. FIG. 1 illustrates a summary of the step of recovering Ru complex dye in each example.

Preliminary test: Various ether-based solvents and alkane-based solvents were studied in terms of their behavior of solubilizing various components in a dye solution (Ru complex, solvent, co-adsorbent, and cocktail dye). According to the test, 1 mL of various ether-based solvents and alkane-based solvents were prepared (temperature of 25° C.), and after mixing with 1 mg of Ru complex (N719, N749, Z907, Z991, and CYC-B11), co-adsorbent (DINHOP, CDCA), or cocktail dye (D35), the dissolving property was evaluated based on the solubility. Similarly, 1 mL of various ether-based solvents and alkane-based solvents (temperature of 25° C.) were admixed with 1 mL of a solvent for dye solution (ethanol, acetonitrile, or t-butanol) to evaluate the dissolving property. With regard to the evaluation of dissolving property, those dissolved at 5 g/L or more and those fully miscible with a solvent for dye solution were labeled as "⊙" with excellent dissolving property, those having solubility of 0.05 g/L or more but less than 5 g/L and those miscible with a solvent for dye solution were labeled as "○" with good dissolving property. Furthermore, those having the solubility of less than 0.05 g/L were labeled as "Δ" with fair dissolving property, and those not dissolved at all, that is, having no dissolving property, were labeled as "x." The evaluation results are shown in Table 2. In Table 2, the results of evaluating the dissolving property in water are also shown for comparison.

TABLE 2

| | Ru complex dye | | | | | Co-adsorbent | | Cocktail dye | Solvent | | |
|---|---|---|---|---|---|---|---|---|---|---|---|
| | N719 | N749 | Z907 | Z991 | CYC-B11 | DINHOP | CDCA | D35 | Ethanol | Acetonitrile | Butanol |
| Diethyl ether | X | | X | X | X | ⊙ | ⊙ | ⊙ | ⊙ | ⊙ | ⊙ |
| Methyl propyl ether | X | X | X | X | X | ⊙ | ⊙ | ⊙ | ⊙ | ⊙ | ⊙ |
| Diisopropyl ether | X | X | X | X | X | ⊙ | ⊙ | ⊙ | ⊙ | ⊙ | ⊙ |
| t-Butyl methyl ether | X | X | X | X | X | ⊙ | ⊙ | ⊙ | ⊙ | ⊙ | ⊙ |

TABLE 2-continued

| | Ru complex dye | | | | | Co-adsorbent | | Cocktail dye | Solvent | | |
|---|---|---|---|---|---|---|---|---|---|---|---|
| | N719 | N749 | Z907 | Z991 | CYC-B11 | DINHOP | CDCA | D35 | Ethanol | Acetonitrile | Butanol |
| Dibutyl ether | X | X | X | X | X | ⊙ | ○ | ○ | ⊙ | ⊙ | ⊙ |
| Isoamyl ether | X | X | X | X | X | ⊙ | Δ | Δ | ⊙ | ⊙ | ⊙ |
| Pentane | X | X | X | X | X | ⊙ | ○ | Δ | ⊙ | ⊙ | ⊙ |
| Hexane | X | X | X | X | X | ⊙ | ○ | Δ | ⊙ | ⊙ | ⊙ |
| Heptane | X | X | X | X | X | ⊙ | ○ | Δ | ⊙ | ⊙ | ⊙ |
| Octane | X | X | X | X | X | ⊙ | Δ | Δ | ⊙ | ⊙ | ⊙ |
| Water | Δ | Δ | X | X | X | Δ | X | X | ⊙ | ⊙ | ⊙ |

⊙ Excellent dissolving property
○ Good dissolving property
Δ Soluble
X Not soluble In the present invention, the characteristics required as a separating solvent are a soluble property for an organic substance (solvent, co-adsorbent, cocktail dye) in a dye solution while no solubility for Ru complex dye. According to Table 2, it is found that the Ru complex dye is insoluble in any of each ether-based solvent and most of the solvent can be applied as a separating solvent. Meanwhile, isoamyl ether ($C_5H_{11}$—O—$C_5H_{11}$) has slightly inferior dissolving property for part of co-adsorbing member (CDCA) and cocktail dye. As such, as a separating solvent for coping with a dye solution having a broad range of composition, an ether solvent having an alkyl group with 4 or less carbon number should be applied.

Similarly, with regard to the alkane-based solvent, Ru complex dye is also insoluble like the ether-based solvent, but it has a sufficient dissolving property for the co-adsorbent. In this regard, compared to the ether-based solvent, the dissolving property for cocktail dye is insufficient. However, considering that cocktail dye is an additive which has lower use frequency than co-adsorbent for a dye solution for manufacturing DSC, it would be suitably applied for an application of dye solution recovery. Meanwhile, since octane with a carbon number of 8 has poor dissolving property for CDCA, those applicable as an alkane-based solvent are from pentane, hexane, and up to heptane.

Based on the above preliminary test, it was confirmed that an ether-based solvent and alkane-based solvent can be used as a preferable separating solvent. In the following example, recovery of Ru complex was performed while suitably selecting a separating solvent from various dye solutions.

Example 1

As a dye solution with the simplest constitution, a treatment of a used dye solution consisting of a Ru complex dye and a solvent was performed. The used dye solution as a subject for the treatment is 250 mL and the constitution is as follows.
Ru complex dye: N749 (0.3 mM)
Solvent: Ethanol For the aforementioned used dye solution, a treatment of the filtering step was performed first. For the filtering step, a membrane filter having 0.1 μm pores was used and the filtering under reduced pressure was performed after lowering the pressure to 0.04 MPa. Accordingly, the solid content was removed. The solid content was fine powder consisting of $TiO_2$ and glass.

Next, the treatment of the separating step was performed. As a separating solvent, 1000 mL of diisopropyl ether was added to the dye solution. According to the addition of a separating solvent, precipitation of the Ru complex dye was shown. The Ru complex dye was separated by filtration followed by washing with diethyl ether. Based on the above, Ru complex dye (N749) was recovered.

Examples 2 to 4

Here, recovery of Ru complex dye (N749) which has been applied with various separating solvents was performed for the same used dye solution as Example 1. The recovery step and conditions like use amount of a separating solvent, or the like are the same as Example 1.

Figure 2:
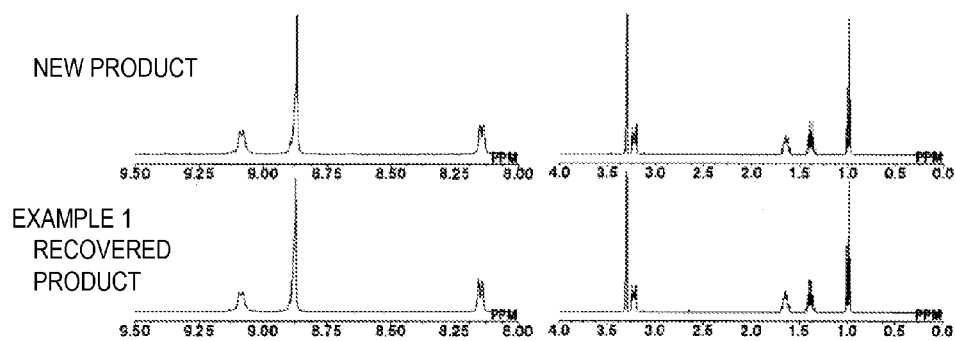
FIG. 2 illustrates a result of $^1$H-NMR analysis for the Ru complex dye which has been recovered in Example 1 and Example 3.
Figure 2:
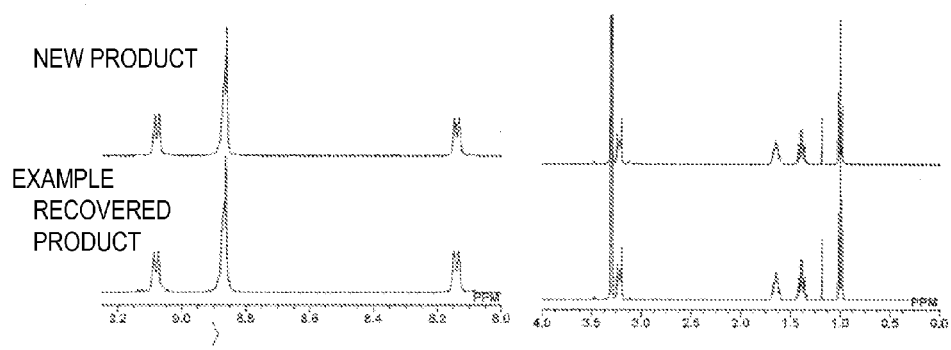

For the Ru complex dye recovered from Example 1 to Example 4, $^1$H-NMR analysis was performed. Results of the Ru complex dye recovered from Example 1 and Example 3 are shown in FIG. 2. As it is recognized from FIG. 2, the Ru complex dye recovered from Example 1 and Example 3 exhibits the same spectrum as a new product N749, and from these examples, it was confirmed that highly pure Ru complex dye (N749) can be recovered. Meanwhile, recovery of highly pure Ru complex dye was also confirmed from Examples 2 and 4.

Example 5

Here, a distillation step was added for the same used dye solution as Example 1 to recover Ru complex dye (N749).

The filtering step is the same as the one in Example 1. In addition, for the distillation step, distillation under reduced pressure was performed with conditions including a pressure of 1000 Pa and a temperature of 40° C. The distillation was performed in a dark space by using an inert gas (argon) circulating type distillation device. With this distillation step, almost half of the ethanol as a solvent was removed.

After the distillation step, 400 mL of diisopropyl ether was added as a separating solvent to the dye solution. Accordingly, precipitation of Ru complex dye was shown. After separating the Ru complex dye by filtration, it was washed with diethyl ether. The recovered Ru complex dye was subjected to $^1$H-NMR analysis, and as a result, it was confirmed that highly pure Ru complex dye (N749) which exhibits the same spectrum as a new product (immediately after synthesis) N749 can be recovered like Example 1.

Example 6

As a used dye solution, a complex solution containing co-adsorbent or the like was employed as a subject for treatment, and recovery of Ru complex dye was performed while performing a recrystallization step in addition to the distillation step. The used dye solution employed as a subject for treatment is 250 mL and the constitution is as follows.

Ru complex dye: CYC-B11 (0.3 mM)
Solvent: Acetonitrile+t-butanol+10% DMSO (acetonitrile:t-butanol=1:1)
Co-adsorbent: DINHOP (0.075 mM)

The filtering step is the same as the one in Example 1. Furthermore, for the distillation step, a two-stage distillation with the first and second stages was performed. Conditions for each distillation were as follows. For the first stage, the pressure was 1000 Pa, the temperature was 40° C., and acetonitrile and t-butanol were removed. For the second stage, the pressure was 150 Pa, the temperature was 40° C., and almost the entire amount of the acetonitrile and t-butanol, which have not been completely removed by the first stage distillation, was removed. The distillations were performed in a dark space by using an inert gas (argon) circulating type distillation device.

After the distillation step, a mixture solution of diethyl ether and ethanol (diethyl ether: 400 mL, ethanol 30 mL) was added as a separating solvent to a dye solution. Herein, the ethanol is a linking solvent which is added considering a property of DMSO in the dye solution that DMSO is hardly mixed•dissolved in diethyl ether. With this separating solvent, precipitation of crude crystals containing Ru complex dye was shown.

Next, from the recovered crude crystals, recovery of Ru complex dye was performed by recrystallization. For the recrystallization step, tetrabutyl ammonium hydroxide (TBAOH), methanol, and water were first added to the crude crystals to dissolve them. The pH was 12 at that time. Then, 0.02 N nitric acid was added dropwise to the solution of crude crystals over 20 minutes until the solution pH became 5.7. According to this pH modification, the Ru complex dye was precipitated. The Ru complex dye was recovered by filtering and separation followed by washing with diethyl ether.

Figure 3:
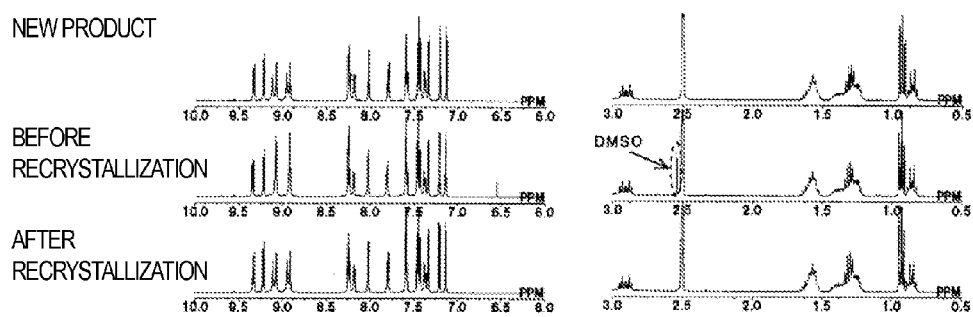
FIG. 3 illustrates a result of $^1$H-NMR analysis for the Ru complex dye which has been recovered in Example 6.

FIG. 3 illustrates a result of $^1$H-NMR analysis carried out for the recovered Ru complex dye. As it is recognized from FIG. 3, the crude crystals before the recrystallization step exhibited a peak derived from DMSO (peak near 2.5 ppm of a spectrum at high magnetic field side), but those undergone the recrystallization exhibited loss of such peak. Thus, it was confirmed that, according to suitable addition of a recrystallization step, highly pure CYC-B11 can be recovered.

Example 7

Recovery of Ru complex dye was performed for a used dye solution with the most complicated constitution in which cocktail dye has been added to the dye solution of Example 6. The used dye solution employed as a subject for treatment is 250 mL and the constitution is as follows.

Ru complex dye: CYC-B11 (0.3 mM)
Solvent: Acetonitrile+t-butanol+10% DMSO (acetonitrile:t-butanol=1:1)
Co-adsorbent: DINHOP (0.075 mM)
Cocktail dye: D35 dye (0.038 mM)

The filtering step is the same as the one in Example 1. Furthermore, the distillation step has a single stage in this example. Conditions for the distillation included a pressure of 1000 Pa and a temperature of 40° C., and a half amount was removed for the acetonitrile and t-butanol, respectively.

In this example, the half amount of t-butanol was maintained as residuals in a treatment solution after the distillation step in consideration of its behavior in DMSO. According to the present inventors, DMSO is hardly mixed or dissolved in ethers (diethyl ether) but has a tendency of being mixed or dissolved in alcohols like ethanol (linking solvent) added in Example 6. As such, by keeping part of t-butanol as residuals in a dye solution, a subsequent separating step can be performed without using a linking solvent. Meanwhile, in this example, the half amount of acetonitrile also remained as residuals in a treatment solution together with t-butanol. However, as it can be separated during the separating step, there is no particular problem.

Then, after the distillation step, 400 mL of diisopropyl ether was added as a separating solvent to the dye solution. Accordingly, precipitation of crude crystals containing Ru complex dye was observed, and they were recovered. From the recovered crude crystals, recovery of Ru complex dye was performed in the same manner as in Example 6 by recrystallization. As a result of performing $^1$H-NMR analysis of the recovered Ru complex dye, the Ru complex dye after the recrystallization step exhibited the same spectrum as a new product CYC-B11, as in the case of Example 6.

Next, by using the Ru complex dye (CYC-B11) recovered from Example 6, DSC was manufactured and evaluated to confirm the possible reusability of a recovered product. For manufacture of DSC in this evaluation test, the recovered CYC-B11 was first prepared as a dye solution having the same composition as Example 6, and a substrate having a TiO$_2$ layer formed on the substrate was impregnated in the dye solution. The substrate was a conductive transparent substrate having a FTO film (sheet resistance of 15Ω/□) formed on a glass substrate (size of 15×25 mm, thickness of 1.8 mm). Furthermore, TiO$_2$ paste was coated on a substrate and calcined at 450° C. to form a TiO$_2$ layer (thickness of 14 μm). After impregnating the TiO$_2$ layer in a dye solution, a platinum plate was adhered as a counter electrode, and by filling an acetonitrile solution containing iodine as an electrolyte between two electrodes, DSC was provided.

Figure 4:
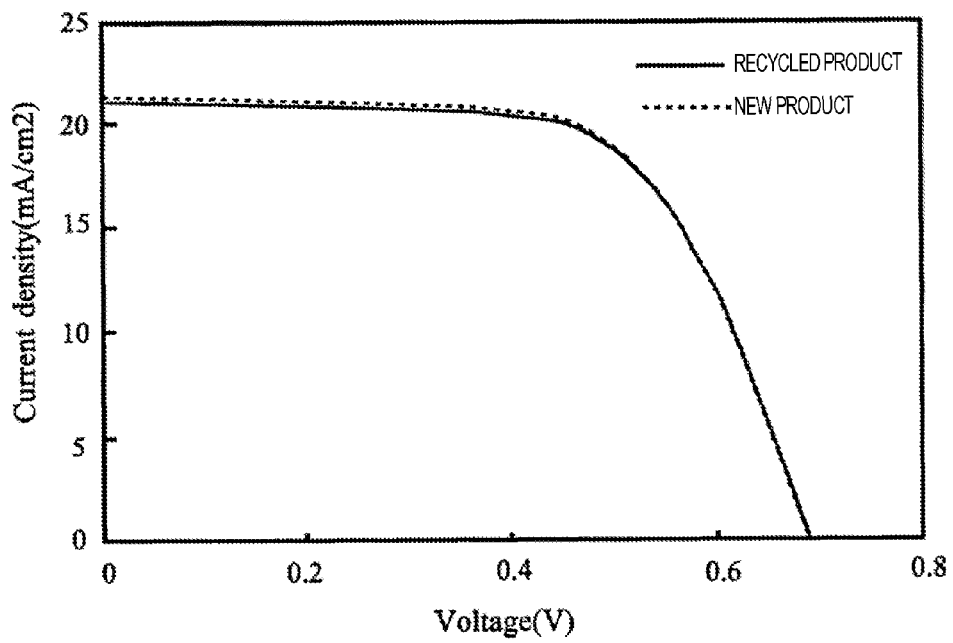
FIG. 4 illustrates a result of property evaluation of DSC prepared by using, as a raw material, the Ru complex dye which has been recovered in Example 6.
Figure 4:
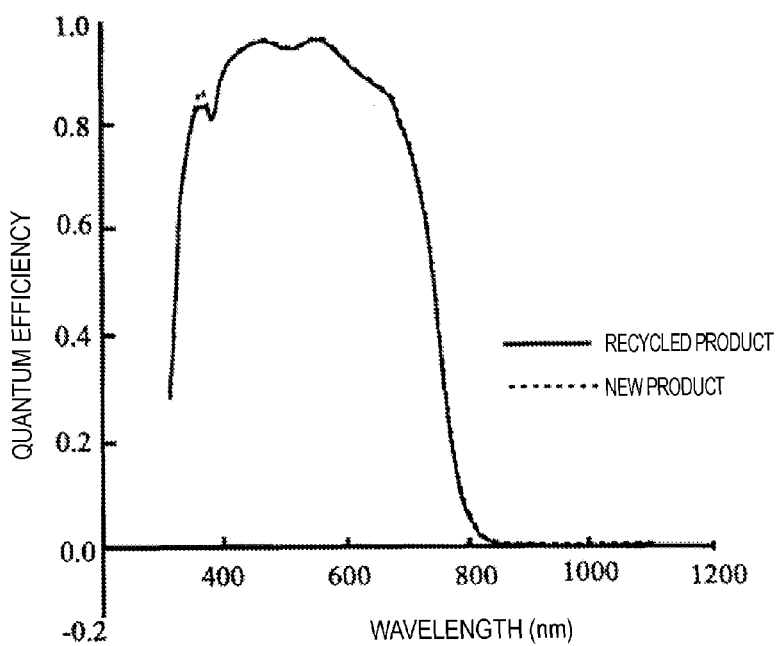

Evaluation of the characteristics of the manufactured DSC was made in such a manner that the J-V characteristics was performed by illuminating pseudo sunlight (100 mW/cm$^2$) by using a solar simulator (manufactured by Yamashita Denso Corporation). Furthermore, measurement of spectral sensitivity (external quantum efficiency) was made in the range of 300 nm to 1100 nm by using SM-250 manufactured by Bunkoukeiki Co., Ltd. Meanwhile, the evaluation also includes measurement of DSC which has been manufactured by using a new product CYC-B11 as a raw material. FIG. 4 shows the result.

From FIG. 4, it was found that DSC manufactured by using, as a raw material, CYC-B11 which has been recovered in Example 6 exhibited no difference in characteristics as if it has been manufactured with a new product. Thus, it was confirmed that the Ru complex dye recovered in the present invention can be used again as a raw material of DSC without any problem.

INDUSTRIAL APPLICABILITY

As it has been described above, by the present invention, Ru complex dye with high quality can be recovered from a used dye solution which has been discharged during a process of manufacturing a dye-sensitized solar cell and treated as a waste liquid. The Ru complex dye recovered by the present invention can be directly used for manufacture of a dye-sensitized solar cell, and thus cost down of highly expensive Ru complex dye can be achieved. According to the present invention, wider distribution of a dye-sensitized solar cell is expected according to cost down of the cell.

The invention claimed is:
1. A method for recovering Ru complex dye from a used dye solution containing a polypyridine Ru complex as a Ru complex, the used dye solution having been discharged from a step of manufacturing a dye-sensitized solar cell, the method comprising the steps of:
- (a): filtering the used dye solution to separate and remove solid content; and
- (b): bringing a separating solvent comprising an ether-based solvent indicated by a chemical formula $C_xH_{(2x+1)}\text{—O-}C_yH_{(2y+1)}$ (x=1 to 4 and y=1 to 4, with the proviso that x+y≥4) or an alkane-based solvent indicated by a chemical formula $C_xH_{(2x+2)}$ (x=5 to 7) into contact with the used dye solution to separate the Ru complex dye.

2. The method for recovering Ru complex dye from a used dye solution according to claim 1, wherein both of the steps (a) and (b) are performed at a treatment temperature of 40° C. or lower and under light-shielding conditions.

3. The method for recovering Ru complex dye from a used dye solution according to claim 1, the method comprising a distillation step of distilling the used dye solution before the step (b), wherein
the distillation step is distillation under reduced pressure which is performed at a pressure of 1000 Pa or less and a temperature of 40° C. or lower, and under an inert gas atmosphere.

4. The method for recovering Ru complex dye from a used dye solution according to claim 1, wherein a recrystallization treatment is performed for the Ru complex dye recovered from the step (b).

5. The method for recovering Ru complex dye from a used dye solution according to claim 2, the method comprising a distillation step of distilling the used dye solution before the step (b), wherein
the distillation step is distillation under reduced pressure which is performed at a pressure of 1000 Pa or less and a temperature of 40° C. or lower, and under an inert gas atmosphere.

6. The method for recovering Ru complex dye from a used dye solution according to claim 2, wherein a recrystallization treatment is performed for the Ru complex dye recovered from the step (b).

7. The method for recovering Ru complex dye from a used dye solution according to claim 3, wherein a recrystallization treatment is performed for the Ru complex dye recovered from the step (b).

\* \* \* \* \*